United States Patent
Telpaz et al.

(10) Patent No.: US 11,780,346 B2
(45) Date of Patent: Oct. 10, 2023

(54) SCHEDULING PRE-DEPARTURE CHARGING OF ELECTRIC VEHICLES

(71) Applicant: GM GLOBAL TECHNOLOGY OPERATIONS LLC, Detroit, MI (US)

(72) Inventors: Ariel Telpaz, Givat Haim Meuhad (IL); Barak Hershkovitz, Herzliya (IL); Nadav Baron, Herzliya (IL); Ravid Erez, Hod-Hasharon (IL); Boris Kabisher, Yokneam (IL); Omer Zerbib, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 248 days.

(21) Appl. No.: 17/215,587

(22) Filed: Mar. 29, 2021

(65) Prior Publication Data
US 2022/0305941 A1    Sep. 29, 2022

(51) Int. Cl.
| | |
|---|---|
| *H02J 7/00* | (2006.01) |
| *B60L 53/66* | (2019.01) |
| *B60H 1/00* | (2006.01) |
| *G06N 3/045* | (2023.01) |
| *G06N 20/00* | (2019.01) |
| *B60L 53/60* | (2019.01) |

(52) U.S. Cl.
CPC ............ *B60L 53/66* (2019.02); *B60H 1/0073* (2019.05); *B60L 53/60* (2019.02); *G06N 3/045* (2023.01); *G06N 20/00* (2019.01); *H02J 7/0048* (2020.01); *H02J 7/0071* (2020.01); *B60L 2240/34* (2013.01); *B60L 2250/14* (2013.01); *B60L 2260/46* (2013.01); *B60L 2260/58* (2013.01)

(58) Field of Classification Search
CPC ...... B60L 53/60; B60L 53/66; B60L 2260/46; B60L 2260/58; B60L 2240/34; B60L 2250/14; H02J 7/0048; H02J 7/0071; G06N 20/00; G06N 3/045; B60H 1/0073
USPC .............................................. 320/109; 701/22
See application file for complete search history.

(56) References Cited

U.S. PATENT DOCUMENTS

| | | | | |
|---|---|---|---|---|
| 2013/0271074 A1* | 10/2013 | Federico | ............. | B60L 15/2045 320/109 |
| 2013/0274972 A1* | 10/2013 | Kusumi | ............. | B60W 50/085 701/22 |

(Continued)

*Primary Examiner* — Zixuan Zhou
(74) *Attorney, Agent, or Firm* — CANTOR COLBURN LLP (57) ABSTRACT

A computer-implemented method for scheduling pre-departure charging for electric vehicles includes predicting a user-departure time based on a first machine learning prediction model. The method further includes determining a cabin temperature to be set for the user at the user-departure time based on a second machine learning prediction model. The method further includes determining a battery-temperature to be set at the user-departure time based on a third machine learning prediction model. The method further includes determining a present charge level of a battery of the electric vehicle. The method further includes computing a charging start-time to start charging the battery based on one or more attributes of a charging station to which the electric vehicle is coupled, and based on the user-departure time, the cabin temperature, and the battery-temperature. The method further includes initiating charging the battery at the charging start-time.

20 Claims, 4 Drawing Sheets

(56) References Cited

U.S. PATENT DOCUMENTS

2014/0005847 A1* 1/2014 Melen ................... G06Q 10/047
                                                    700/291
2022/0224119 A1* 7/2022 Badger, II ............... B60L 58/12

* cited by examiner

SCHEDULING PRE-DEPARTURE CHARGING OF ELECTRIC VEHICLES

INTRODUCTION

The present disclosure relates to systems, storage media and methods for pre-departure charging scheduling for electric vehicles based on usage and charging patterns.

Various types of automotive vehicles, such as electric vehicles (EVs), extended-range electric vehicles (EREVs), and hybrid electric vehicles (HEVs) are equipped with energy storage systems that require periodic charging. The energy storage system may be charged by connecting to a power source, such as an AC supply line. It should be noted that any automotive vehicle that is charged using an AC supply line is referred to as an "electric vehicle" herein.

SUMMARY

According to one or more embodiments, a system includes a memory device, and one or more hardware processors configured by machine-readable instructions for scheduling pre-departure charging for electric vehicles. The one or more hardware processors are configured to predict a user-departure time based on a first machine learning prediction model, wherein the user-departure time represents when a user initiates driving an electric vehicle. The one or more hardware processors are further configured to determine a cabin temperature to be set for the user at the user-departure time based on a second machine learning prediction model. The one or more hardware processors are further configured to determine a battery-temperature of a battery of the electric vehicle to be set at the user-departure time based on a third machine learning prediction model. The one or more hardware processors are further configured to determine a present charge level of a battery of the electric vehicle. The one or more hardware processors are further configured to compute a charging start-time to start charging the battery based on one or more attributes of a charging station to which the electric vehicle is coupled, and based on the user-departure time, the cabin temperature, and the battery-temperature. The one or more hardware processors are further configured to start charging the battery at the charging start-time.

In one or more embodiments, the one or more hardware processors are further configured to start the electric vehicle at a vehicle start-time, which is prior to the user-departure time.

In one or more embodiments, the cabin temperature is adjusted at the vehicle start-time.

In one or more embodiments, the one or more attributes of the charging station are determined based on a prior charging session by the electric vehicle.

In one or more embodiments, the one or more attributes of the charging station are determined based on a prior charging session by another electric vehicle, wherein the one or more attributes are stored in a remote location.

In one or more embodiments, the one or more hardware processors are further configured to display, to the user, a confirmation message comprising one or more predicted values comprising the user-departure time, and the cabin temperature.

In one or more embodiments, the one or more hardware processors are further configured to receive, from the user, adjustments to at least one of the user-departure time, and the cabin temperature.

According to one or more embodiments, a non-transient computer-readable storage medium includes computer executable instructions, wherein one or more processors execute the computer executable instructions to perform a method for scheduling pre-departure charging for electric vehicles. The method includes predicting a user-departure time based on a first machine learning prediction model, wherein the user-departure time represents when a user initiates driving an electric vehicle. The method further includes determining a cabin temperature to be set for the user at the user-departure time based on a second machine learning prediction model. The method further includes determining a battery-temperature of a battery of the electric vehicle to be set at the user-departure time based on a third machine learning prediction model. The method further includes determining a present charge level of a battery of the electric vehicle. The method further includes computing a charging start-time to start charging the battery based on one or more attributes of a charging station to which the electric vehicle is coupled, and based on the user-departure time, the cabin temperature, and the battery-temperature. The method further includes initiating charging the battery at the charging start-time.

In one or more embodiments, the method further comprises starting the electric vehicle at a vehicle start-time, which is prior to the user-departure time.

In one or more embodiments, the cabin temperature is adjusted at the vehicle start-time.

In one or more embodiments, the one or more attributes of the charging station are determined based on a prior charging session by the electric vehicle.

In one or more embodiments, the one or more attributes of the charging station are determined based on a prior charging session by another electric vehicle, wherein the one or more attributes are stored in a remote location.

In one or more embodiments, the method further comprises displaying, to the user, a confirmation message comprising one or more predicted values comprising the user-departure time, and the cabin temperature.

In one or more embodiments, the method further comprises receiving, from the user, adjustments to at least one of the user-departure time, and the cabin temperature.

According to one or more embodiments, a computer-implemented method for scheduling pre-departure charging for electric vehicles includes predicting a user-departure time based on a first machine learning prediction model, wherein the user-departure time represents when a user initiates driving an electric vehicle. The method further includes determining a cabin temperature to be set for the user at the user-departure time based on a second machine learning prediction model. The method further includes determining a battery-temperature of a battery of the electric vehicle to be set at the user-departure time based on a third machine learning prediction model. The method further includes determining a present charge level of a battery of the electric vehicle. The method further includes computing a charging start-time to start charging the battery based on one or more attributes of a charging station to which the electric vehicle is coupled, and based on the user-departure time, the cabin temperature, and the battery-temperature. The method further includes initiating charging the battery at the charging start-time.

In one or more embodiments, the method further comprises starting the electric vehicle at a vehicle start-time, which is prior to the user-departure time.

In one or more embodiments, the cabin temperature is adjusted at the vehicle start-time.

In one or more embodiments, the one or more attributes of the charging station are determined based on a prior charging session by the electric vehicle.

In one or more embodiments, the one or more attributes of the charging station are determined based on a prior charging session by another electric vehicle, wherein the one or more attributes are stored in a remote location.

In one or more embodiments, the method further comprises displaying, to the user, a confirmation message comprising one or more predicted values comprising the user-departure time, and the cabin temperature.

In one or more embodiments, the method further comprises receiving, from the user, adjustments to at least one of the user-departure time, and the cabin temperature.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
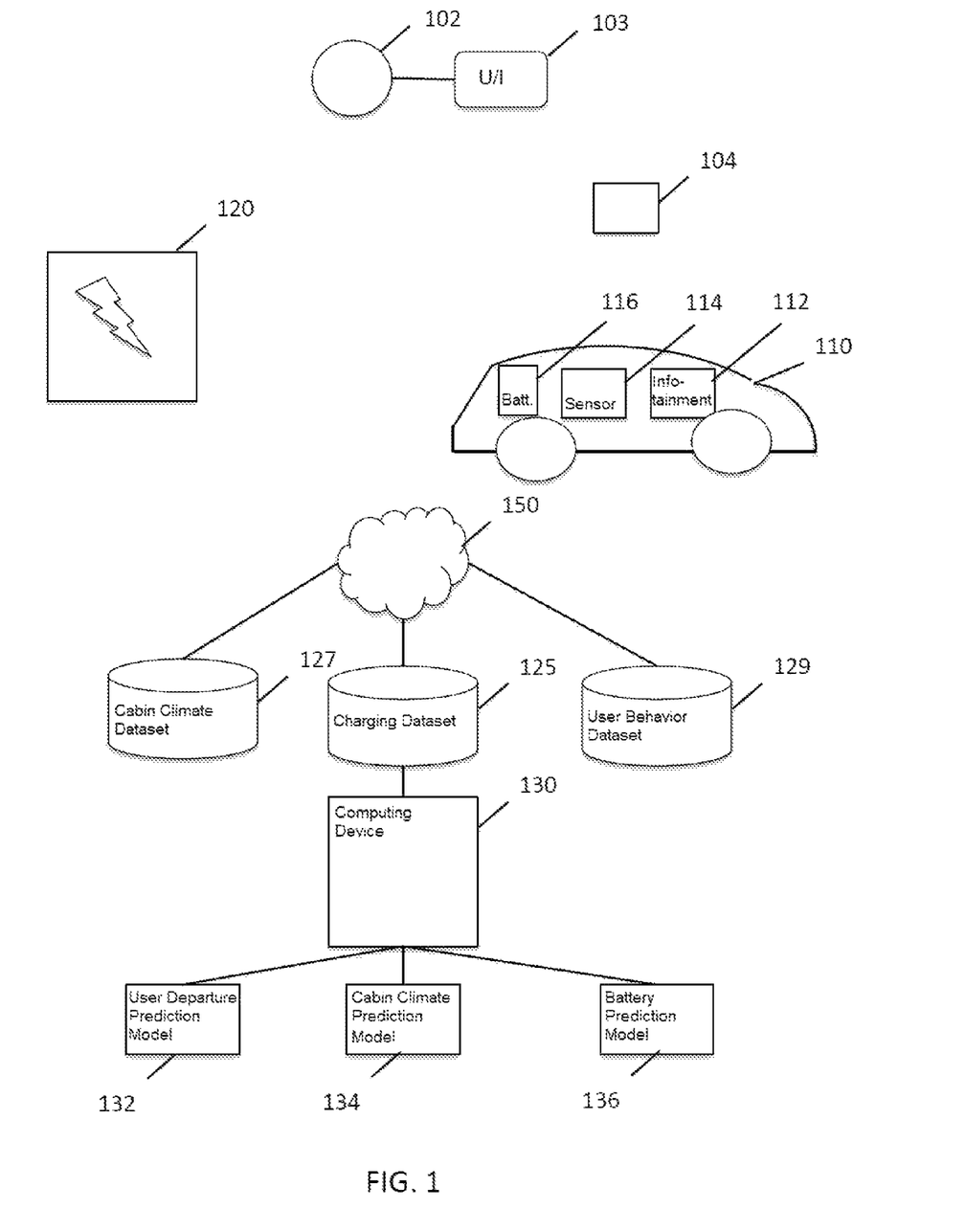
FIG. 1 illustrates a system configured for scheduling pre-departure charging of electric vehicles according to one or more embodiments.

FIG. 1 illustrates a system 100 configured for scheduling pre-departure charging of electric vehicles. A user 102 of an electric vehicle 110 ("vehicle") is presented a user interface 103 that displays information of one or more charging stations 120, one or more predictions, and one or more options for scheduling such pre-departure charging of the vehicle 110, in one or more embodiments. In one or more embodiments, the user 102 can select one or more options via the user interface 103 to adjust actions to be taken for scheduling the pre-departure charging of the vehicle 110.

The user interface 103 is presented to the user 102 via a communication device 104 in one or more embodiments. The communication device 104 can be a phone, a tablet computer, a laptop computer, a desktop computer, or any other communication device. The communication device 104 can include one or more processing units such as microprocessors, and other such processing units that can execute one or more computer executable instructions. The communication device 104 can also include one or more memory devices that store computer executable instructions and/or other data that is used for execution of the computer executable instructions.

In one or more embodiments, the user interface 103 is presented to the user 102 via an infotainment system 112 of the vehicle 110. The infotainment system 112 can include one or more processing units such as engine control units (ECUs), microprocessors, and other processing units that can execute one or more computer executable instructions. The infotainment system 112 can also include one or more memory devices that store computer executable instructions and/or other data that is used for execution of the computer executable instructions. The infotainment system 112 can be considered as a vehicle controller that manages various operations of the vehicle 110.

In one or more embodiments, the infotainment system 112 can access one or more sensors 114. The infotainment system 112 can access data from the sensors 114, for example, using an application programming interface of the respective sensors 114. The sensors 114 include a location sensor, for example, a global positioning system (GPS) that provides information about the geographic location of the vehicle 110. The sensors 114 further include a charging station sensor that identifies one or more attributes of the charging station 120 being used to charge the vehicle 110.

Attributes of the charging station 120 can include a unique station-identifier, charging speed (charging level), wattage, session fees, time fees, per kilowatt hour fees, penalties for staying over time limit, and other such attributes.

When the user 102 uses the charging station 120 to recharge the vehicle 110, the infotainment system 112 records a charging session in a dataset 125. The charging session dataset 125 is stored at a location that is remote from the vehicle 110. It is understood that the infotainment system 112 can maintain a local copy of the charging session data that is recorded in the charging session dataset 125. Further, it should be noted that the infotainment system 112 can record the charging session data in the charging session dataset 125 during the recharging, or at a later time. The infotainment system 112 accesses the charging session dataset 125 via a communication network 150, such as a WIFI® network, a cellular network, or any other type of communication network or a combination thereof.

The charging session dataset 125 is a database that stores multiple charging session data entries. While FIG. 1 depicts the charging session dataset 125 receiving data from a single vehicle 110, in some embodiments, the charging session dataset 125 receives charging session data entries from several vehicles 110. In some embodiments, the charging dataset 125 can include data associated with a particular charging station 120 collected from multiple vehicles 110.

Table 1 depicts a charging session dataset 125 according to one or more embodiments. Each entry in the charging session dataset 125 represents a charging session. Each entry includes identifying information associated with the charging session, such as a unique identifier of the charging session, a unique identifier of the charging station 120, a unique identifier of the vehicle 110, a unique identifier of the user 102 initiating the charging, etc. In addition, each entry includes several attributes associated with the charging session, such as the wattage, charging speed, charge pricing, and other such attributes of the charging station 120. It is understood that the number of attributes and number of entries shown in Table 1 are illustrative and that in embodiments of the technical solutions described herein, those numbers can vary.

TABLE 1

| Session ID | Vehicle ID | Station ID | User ID | Attribute 1 | Attribute 2 | ... |
|---|---|---|---|---|---|---|
| | | | | | | |

The sensors 114 further include one or more cabin sensors that detect temperature, humidity, airflow, and other cabin climate related measurements within the cabin (i.e., inside) the vehicle 110. The cabin sensors facilitate detection and storage of data associated with heating, ventilation, and air conditioning (HVAC) of the cabin.

When the user 102 uses one or more interfaces (not shown), such as buttons, touchscreen, etc. to adjust HVAC of the cabin, the infotainment system 112 records a cabin climate session in a cabin climate dataset 127. The cabin climate dataset 127 is stored at a location that is remote from the vehicle 110. It is understood that the infotainment system 112 can maintain a local copy of the cabin climate dataset 127. The infotainment system 112 accesses the cabin climate dataset 127 via the communication network 150. The cabin climate dataset 127 is a database that stores multiple cabin climate data entries, which are particular to the user 102 of the vehicle 110.

Table 2 depicts a cabin climate dataset 127 according to one or more embodiments. Each entry in the user-comfort dataset 127 represents a change made to the cabin climate and particular contextual information at the time of such change being made. Each entry includes identifying information, such as a unique identifier of the entry, a unique identifier of the user 102 initiating the change, etc. In addition, each entry includes several attributes associated with the change, such as a previous temperature, set temperature, outside temperature, time of day, battery charge level, and other attributes that provide contextual information of the change in the cabin climate. It is understood that the number of attributes and number of entries shown in Table 2 are illustrative and that in embodiments of the technical solutions described herein, those numbers can vary.

TABLE 2

| Identifier | User Identifier | Prev. Temp | New Set Temp | Outside Temp | ... |
|---|---|---|---|---|---|
| | | | | | |

The infotainment system 112 further records user behavior, particularly associated with trips with the vehicle 110, in a user behavior dataset 129. The user behavior dataset 129 is stored at a location that is remote from the vehicle 110. It is understood that the infotainment system 112 can maintain a local copy of the user behavior dataset 129. The infotainment system 112 accesses the user behavior dataset 129 via the communication network 150. The user behavior dataset 129 is a database that stores multiple user behavior data entries, which are particular to the user 102 of the vehicle 110.

Table 3 depicts a user behavior dataset 129 according to one or more embodiments. Each entry in the user behavior dataset 129 represents a trip made by the user 102. Each entry includes identifying information, such as a unique identifier of the entry, and in addition, several attributes associated with the trip, such as start time(s), stop time(s), route(s), start location(s), stop location(s), distance(s) travelled in the trip, and the like. The sensors 114 further include one or more sensors that detect the amount of charge in a battery 116 of the vehicle 110, a temperature of the battery 116, and other attributes of the battery 116. In some embodiments, the battery charge level, and other attributes of the battery 116 are stored as part of the user behavior entry. For example, the battery charge level at the start time, and at the stop time can be recorded. The battery charge level at different timepoints in the trip can also be recorded in one or more embodiments. In some embodiments, the battery temperatures at the start time, and at the stop time, are also recorded. The battery temperatures at additional timepoints can also be stored in one or more embodiments. It is understood that the number of attributes and number of entries shown in Table 3 are illustrative and that in embodiments of the technical solutions described herein, those numbers can vary.

TABLE 3

| Trip Identifier | Start time | Stop time | Distance | Locations | Battery level | ... |
|---|---|---|---|---|---|---|
| | | | | | | |

A technical challenge with electric vehicles is that climate control use during the ride reduces the battery range. Technical solutions described herein facilitate the vehicle 110 to be preconditioned ahead of departure to improve the battery range and improve user comfort by preconditioning the cabin climate. For example, one or more embodiments facilitate adjusting the cabin climate to a predicted user comfort level while the vehicle 110 is charging. Accordingly, a desired cabin climate, for example, temperature, is achieved without consuming energy from the battery 116.

Embodiments described herein further facilitate getting the battery 116 to an operating temperature, which is a predetermined temperature, before the user 102 departs. Having the battery 116 achieve the operating temperature prior to using the vehicle 110 conserves energy and improves the battery range. Embodiments described herein facilitate using machine learning techniques, such as neural networks, to determine what should be the optimal time to start charging the vehicle 110 pre-departure. Embodiments described herein provide technical solutions that consider several factors, such as user desired temperature, external temperature, and charging station characteristics, among others, in determining the charging start-time.

Referring to FIG. 1 again, the charging session dataset 125, the cabin climate dataset 127, and the user behavior dataset 129 (collectively, "datasets"), are accessible by a computing device 130. The computing device 130 can be a server computer, a laptop computer, a tablet computer, a desktop computer, or any other such device that includes one or more processing units coupled with one or more memory devices. The processing units execute one or more computer executable instructions that are stored on the memory devices. In one or more embodiments, the processing units execute the computer executable instructions to implement one or more methods described herein.

The computing device 130 analyzes the datasets. The computing device 130, based on the analysis, generates a pre-departure charging schedule for the battery 116. The computing device 130 trains a user departure prediction model 132 to predict a user departure schedule. The user departure prediction model 132 is a machine-learning based model that is implemented by the computing device 130. For example, the computing device 130 can use techniques such as decision trees, logistic regression, random forest, neural networks, or any other machine-learning technique to implement the user departure prediction model 132. It should be noted that the type of prediction model used does not affect the aspects of the technical solutions described herein. The user departure prediction model 132 is trained to output one or more user-departure times, and one or more respectively corresponding confidence scores. A confidence score represents a probability that the user 102 will depart at the corresponding predicted user-departure time. The user departure prediction model 132 is trained to generate the output based on the user behavior dataset 129, and spatial-temporal context. The spatial-temporal context includes the present location of the vehicle 110 (and hence, the user 102), time of day, day of week, etc. The user departure prediction model 132 is pre-trained in one or more embodiments. In some embodiments, the user departure prediction model 132 is continuously trained.

In one or more embodiments, the user departure prediction model 132 determines whether the user 102 has a consistent routine for a week, a day of the week, or any other such predetermined time duration. For example, the user 102 starts the vehicle 110 at substantially 8:00 AM every weekday (Monday-Friday) at a particular location (e.g., his/her home), drives to a particular second location (e.g., work), parks the vehicle 110 until 5:00 PM, and returns to the first location thereafter. If such a routine is observed, within a predetermined tolerance threshold (e.g., 15 minutes, 30 minutes, etc.), the user departure prediction model 132 determines that the user 102 follows a consistent routine on weekdays. Alternatively, or in addition, the user 102 can have a consistent routine on the weekend too. For example, on Saturdays, the user 102 leaves the first location at 10:00 AM, drives to a third location (e.g., gym, park, etc.), parks there until 4:00 PM, and returns to the first location thereafter. On Sundays, the user 102 leaves the first location at 11:00 AM, drives to a fourth location (e.g., mall, grocery store, restaurant, etc.), parks there until 2:00 PM, and returns to the first location thereafter. Such trips are recorded in the user behavior dataset 129, as noted herein. It is understood that the times and days can vary in different embodiments. Further, it is understood that the routine can be deemed consistent by the user departure prediction model 132 as long as the user 102 proceeds in this manner for at least a predetermined number of times.

In the above example scenario, the user 102 can charge the vehicle 110 at charging stations 120 at any of the first, second, third, or fourth locations. The attributes of the charging stations 120 that are used are recorded in the charging session dataset 125.

Alternatively, the user departure prediction model 132 determines that the user 102 has an inconsistent schedule. For example, when the user 102 performs one or more activities at particular times but does not repeat these activities for at least the predetermined number of times. In one or more embodiments, the computing device 130 predicts departure time only for users 102 with a consistent routine. For example, the computing device 130 uses a predicted user-departure time, or any other predicted value only when a confidence score associated with the prediction is above a pre-defined threshold.

Further, the computing device 130 trains a cabin climate prediction model 134 to predict a user desired cabin climate at the user departure time, and other times. The cabin climate prediction model 134 is a machine-learning based model that is implemented by the computing device 130. For example, the computing device 130 can use techniques such as decision trees, logistic regression, random forest, neural networks, or any other machine-learning technique to implement the cabin climate prediction model 134. It should be noted that the type of prediction model used does not affect the aspects of the technical solutions described herein. The cabin climate prediction model 134 is trained to output one or more sets of cabin climate attributes, and one or more respectively corresponding confidence scores. A confidence score represents a probability that the user 102 desires the corresponding cabin climate attributes at the predicted user-departure time. The cabin climate prediction model 134 is trained to generate the output based on the datasets, including the cabin climate dataset 127, and one or more external factors. The external factors include the present location of the vehicle 110 (and hence, the user 102), weather conditions at the present location, time of day, etc. The cabin climate prediction model 134 is pre-trained in one or more embodiments. In some embodiments, the cabin climate prediction model 134 is continuously trained as the user 102 operates the vehicle 110. A set of cabin climate attributes includes cabin temperature, cabin humidity, etc.

Additionally, the computing device 130 trains a battery prediction model 136 to predict one or more attributes of the battery 116 at the user departure time in response to charging the battery using the charging station 120 at the present location of the vehicle 110. The battery prediction model 136 is a machine-learning based model that is implemented by the computing device 130. For example, the computing device 130 can use techniques such as decision trees, logistic regression, random forest, neural networks, or any other machine-learning technique to implement the battery prediction model 136. It should be noted that the type of prediction model used does not affect the aspects of the technical solutions described herein. The battery prediction model 136 is trained to output one or more sets of battery attributes, and one or more respectively corresponding confidence scores. A confidence score represents a probability that the battery 116 exhibits the battery attributes at the predicted user-departure time. The battery prediction model 136 is trained to generate the output based on the datasets, including the charging session dataset 125, and one or more external factors. The external factors include the present location of the vehicle 110, charging station 120 (and its attributes) at the present location, present battery charge level, etc. The battery prediction model 136 is pre-trained in one or more embodiments. In some embodiments, the battery prediction model 136 is continuously trained as the user 102 operates the vehicle 110. The battery attributes that are predicted include battery charge level, battery temperature, etc.

Figure 2:
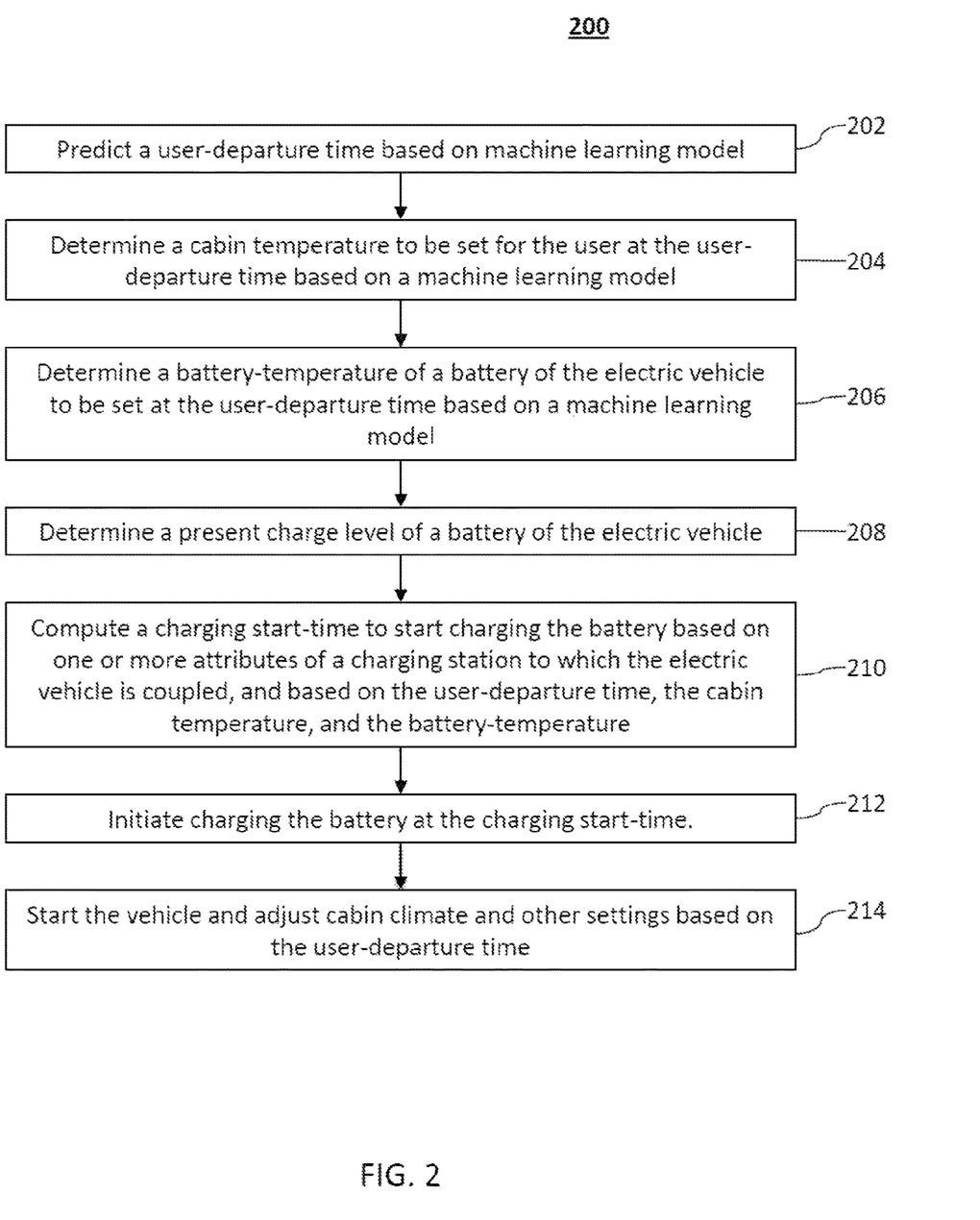
FIG. 2 illustrates a flowchart of a method for scheduling pre-departure charging of electric vehicles according to one or more embodiments.

FIG. 2 depicts a flowchart of a method for generating the pre-departure charging schedule for the vehicle according to one or more embodiments. The method 200 can be implemented by the computing device 130 that is remote from the vehicle 110 in one or more embodiments. Alternatively, in one or more embodiments, the method 200 can be implemented by the infotainment system 112 of the vehicle. Alternatively, the infotainment system 112 and the computing device 130 execute the method 200 in combination. In yet other embodiments, the method 200 can be executed by a combination of computing devices that includes the computing device 130, the infotainment system, the communication device 104, etc.

The method 200 includes predicting a user-departure time based on user departure prediction model 132, at block 202. The user-departure time represents when the user 102 initiates driving the vehicle 110. Further, at block 204, a cabin climate to be set for the user 102 at the user-departure time is determined based on the cabin climate prediction model 134. At block 206, the battery prediction model 136 outputs predicted battery conditions at the user-departure time if the battery 116 is charged using the charging station 120 at the present location of the vehicle 110.

The present charge level of the battery 116 is determined, at block 208. The battery prediction model 136 can use the present charge level to determine the amount of time required to charge the battery 116 to a predetermined value, for example, fully charged (100% charged), 90% charged, or any other such predetermined value.

At block 210, a charging start-time is determined at which to start charging the battery 116. The charging start-time is determined based on the predictions from the user departure prediction model 132, the cabin climate prediction model 134, and the battery prediction model 136, among other factors. As noted herein, by using the prediction models 132, 134, 136, determining the charging start-time takes into consideration one or more attributes of the charging station 120 to which the vehicle 110 is coupled, the user-departure time, the desired cabin climate, and a predicted battery-temperature at the user-departure time because of the charging.

In one or more embodiments, the charging start-time is displayed to the user 102 via the user-interface 103. The user-interface 103 can further include the predictions of the desired cabin climate, user-departure time, etc., which are used to determine the charging start-time. The user 102 can adjust one or more of the predicted values in one or more embodiments. Alternatively, or in addition, the user 102 can confirm the displayed values that are used to compute the charging start-time. The charging start-time is recomputed based on any adjustments made by the user 102.

At block 212, charging the battery 116 is initiated at the computed charging start-time. Accordingly, the battery 116 is at the predetermined charge level, and the predetermined operating temperature at the user-departure time. Further, in one or more embodiments, the vehicle 110 is started based on the user-departure time, at block 214. For example, the vehicle 110 is started at the user-departure time, or a predetermined duration, (e.g., 5 minutes, 2 minutes, 15 minutes etc.) prior to the user-departure time. One or more settings of the vehicle 110 are adjusted at the start, for example, the cabin climate, entertainment system settings (e.g., radio station, navigation destination, etc.), when the vehicle is started.

Figure 3:
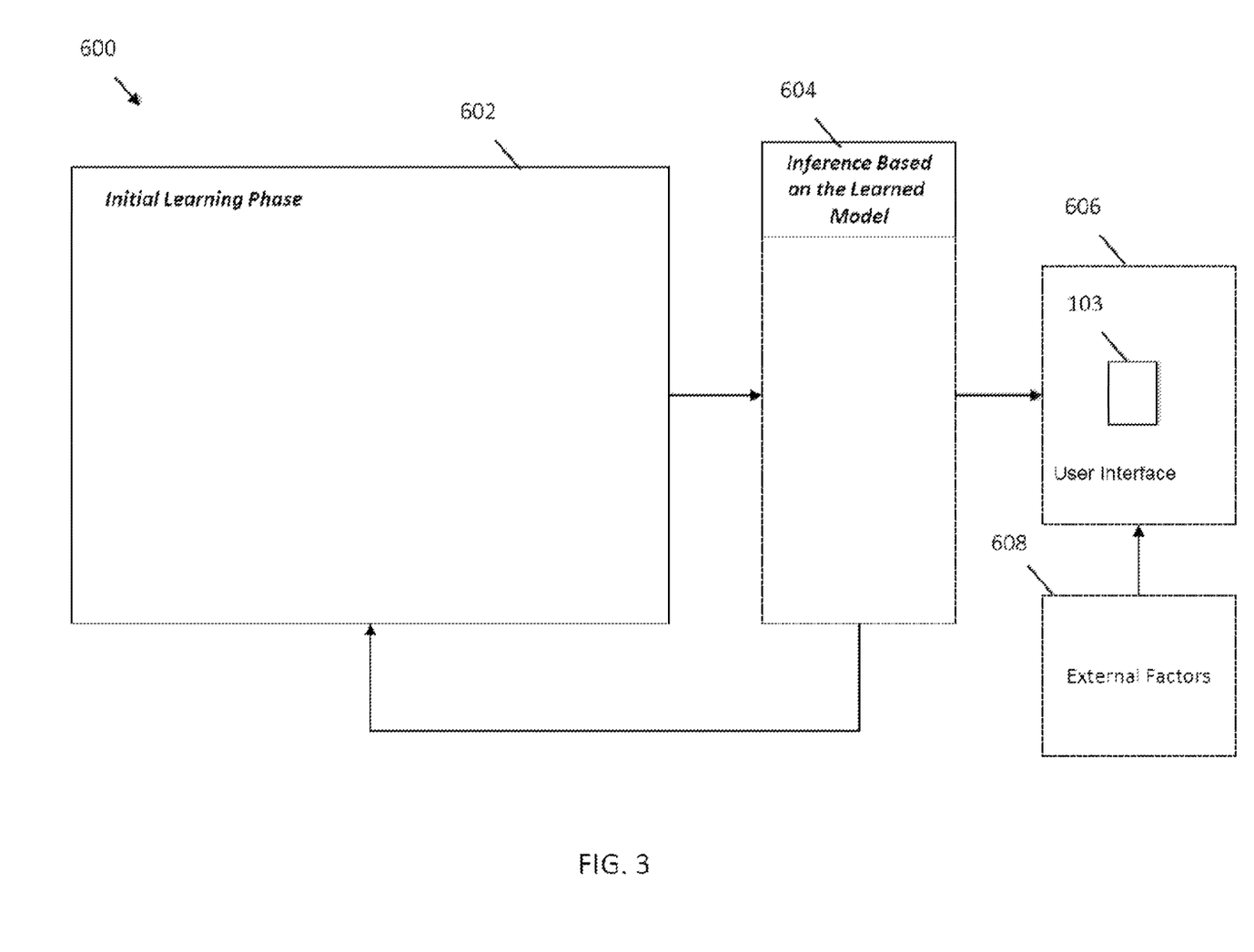
FIG. 3 depicts an example scenario of scheduling pre-departure charging of electric vehicles according to one or more embodiments.

FIG. 3 depicts an example scenario 600 of for generating the pre-departure charging schedule for the vehicle according to one or more embodiments. Generating the pre-departure charging schedule uses one or more attributes of the battery 116, the charging station 120, the user 102, along with one or more external factors. The attributes of the battery 116 include charge level, temperature, capacity, charging time, etc. The attributes of the charging station 120 include charging rate, wattage, pricing, etc. The attributes of the user 102 include typical departure time, desired cabin climate settings, typical ride distance, etc.

The attributes are accessed via the datasets 125, 127, and 129 to train the machine learning models 132, 134, and 136 during an initial learning phase 602. The machine learning models 132, 134, and 136 are trained by the computing device 130 in one or more embodiments, which is remote from the vehicle 110. The trained machine learning models 132, 134, and 136 are subsequently stored in the vehicle 110, for example, in the infotainment system 112. The infotainment system 112 uses the machine learning models 132, 134, and 136 to perform the method 200 in one or more embodiments during an inference phase 604. Alternatively, the computing device 130 executes the method 200, in conjunction with the infotainment system 112 during the inference phase 604. The inference phase 604 includes predicting the user-departure time, the desired cabin climate, and the charging time required to charge the battery 116 to at least a predetermined level. As noted, the inference phase 604 uses, as input, the present condition of the vehicle 110 (such as location, battery charge level, etc.), and external factors (608) from the surroundings (such as weather, charging station 120, etc.) to generate the predictions. The external factors 608 can be accessed via third-party providers using one or more application programming interfaces, queries, or other such techniques. For example, the third-party providers can include computer servers, web services, etc., such as weather forecast providers, charging station information providers, navigation database providers, etc.

The predictions are used to determine a charging start-time when the battery charging is to be initiated so that the battery 116 is not only charged to at least the predetermined level but is also at the predetermined operating temperature for optimal performance.

In one or more embodiments, the predictions are displayed to the user 102 via the user interface 103 (606). The user 102 can confirm and/or adjust the predicted values. The charging start-time is adjusted if the user 102 adjusts any of the predicted values. Such user interaction can be performed, for example, when the user 102 is about to exit the vehicle 110 after a trip is completed by displaying the predictions on the infotainment system 112. Alternatively, or in addition, the user interaction can be performed by providing the predictions to the user 102 via the communication device 104 via a push-notification when the predictions are ready, or at a pre-scheduled time, etc.

Embodiments of the technical solutions described herein facilitate predicting departure time from a location of an electric vehicle's user, which in turn facilitates increasing the battery range. This is achieved by one or more embodiments herein by bringing the battery of the electric vehicle to an operating temperature before the user departs, thereby conserving energy in the battery. Further, embodiments described herein bring the cabin to a predicted temperature while the vehicle is in charge mode to reduce energy consumption from the battery for climate control during the ride.

In one or more embodiments, the user can manually inform the vehicle controller about the departure time. Alternatively, or in addition, the vehicle's controller can use machine learning techniques to learn and determine the user charging and departure times, and desired cabin temperature. Using such information, and additional factors, such as external temperature, charging station attributes, the vehicle controller can schedule when to start charging the battery of the electric vehicle, and adjust the cabin climate while charging. Accordingly, embodiments described herein provide technical solutions to generate a pre-departure charging schedule to optimize energy costs, and battery longevity. Further, embodiments herein ensure that the charging is completed in time for the user's departure.

Figure 4:
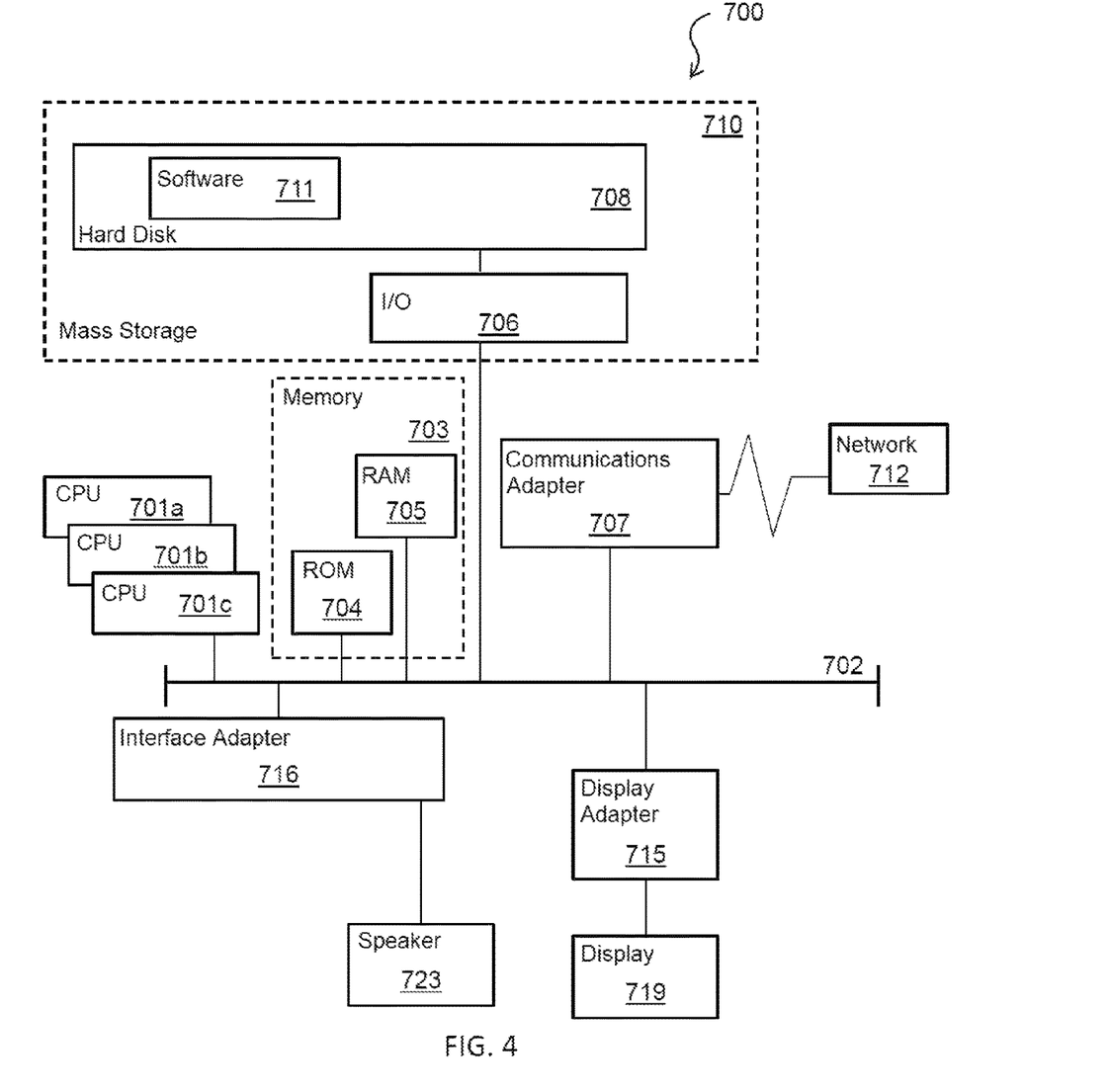
FIG. 4 depicts a computer system in accordance with an embodiment.

Turning now to FIG. 4, a computer system 700 is generally shown in accordance with an embodiment. The computer system 700 can be used as the computing device 130, the device 104, or any other device to implement one or more methods and/or operations described herein. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system to coordinate the functions of the various components shown in FIG. 4.

Additional input/output devices are shown as connected to the system bus 702 via a display adapter 715 and an interface adapter 716. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by the display adapter 715, which may include a graphics controller to improve the performance of graphics intensive applications and a video controller. A keyboard, a mouse, a touchscreen, one or more buttons, a speaker, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 700 includes processing capability in the form of the processors 701, and, storage capability including the system memory 703 and the mass storage 710, input means such as the buttons, touchscreen, and output capability including a speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 4 is not intended to indicate that the computer system 700 is to include all of the components shown. Rather, the computer system 700 can include any appropriate fewer or additional components not illustrated in FIG. 4 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope of the application.

What is claimed is:

1. A system, comprising:
a memory device; and
one or more hardware processors configured by machine-readable instructions for scheduling pre-departure charging for electric vehicles, the one or more hardware processors configured to:
predict a user-departure time based on a first machine learning prediction model, wherein the user-departure time represents when a user initiates driving an electric vehicle;
determine a cabin temperature to be set for the user at the user-departure time based on a second machine learning prediction model;
determine a battery-temperature of a battery of the electric vehicle to be set at the user-departure time based on a third machine learning prediction model;
determine a present charge level of a battery of the electric vehicle;
compute a charging start-time to start charging the battery based on one or more attributes of a charging station to which the electric vehicle is coupled, and based on the user-departure time, the cabin temperature, and the battery-temperature; and
start charging the battery at the charging start-time.

2. The system of claim 1, wherein the one or more hardware processors are further configured to start the electric vehicle at a vehicle start-time, which is prior to the user-departure time.

3. The system of claim 2, wherein the cabin temperature is adjusted at the vehicle start-time.

4. The system of claim 1, wherein the one or more attributes of the charging station are determined based on a prior charging session by the electric vehicle.

5. The system of claim 1, wherein the one or more attributes of the charging station are determined based on a prior charging session by another electric vehicle, wherein the one or more attributes are stored in a remote location.

6. The system of claim 1, wherein the one or more hardware processors are further configured to display, to the user, a confirmation message comprising one or more predicted values comprising the user-departure time, and the cabin temperature.

7. The system of claim 6, wherein the one or more hardware processors are further configured to receive, from the user, adjustments to at least one of the user-departure time, and the cabin temperature.

8. A non-transitory computer-readable storage medium comprising instructions being executable by one or more processors to perform a method for scheduling pre-departure charging for electric vehicles, the method comprising:
predicting a user-departure time based on a first machine learning prediction model, wherein the user-departure time represents when a user initiates driving an electric vehicle;
determining a cabin temperature to be set for the user at the user-departure time based on a second machine learning prediction model;
determining a battery-temperature of a battery of the electric vehicle to be set at the user-departure time based on a third machine learning prediction model;
determining a present charge level of a battery of the electric vehicle;
computing a charging start-time to start charging the battery based on one or more attributes of a charging station to which the electric vehicle is coupled, and based on the user-departure time, the cabin temperature, and the battery-temperature; and
initiating charging the battery at the charging start-time.

9. The computer-readable storage medium of claim 8, wherein the method further comprises starting the electric vehicle at a vehicle start-time, which is prior to the user-departure time.

10. The computer-readable storage medium of claim 9, wherein the cabin temperature is adjusted at the vehicle start-time.

11. The computer-readable storage medium of claim 8, wherein the one or more attributes of the charging station are determined based on a prior charging session by the electric vehicle.

12. The computer-readable storage medium of claim 8, wherein the one or more attributes of the charging station are determined based on a prior charging session by another electric vehicle, wherein the one or more attributes are stored in a remote location.

13. The computer-readable storage medium of claim 8, wherein the method further comprises displaying, to the user, a confirmation message comprising one or more predicted values comprising the user-departure time, and the cabin temperature.

14. The computer-readable storage medium of claim 13, wherein the method further comprises receiving, from the user, adjustments to at least one of the user-departure time, and the cabin temperature.

15. A computer-implemented method for scheduling pre-departure charging for electric vehicles, the computer-implemented method comprising:
predicting a user-departure time based on a first machine learning prediction model, wherein the user-departure time represents when a user initiates driving an electric vehicle;
determining a cabin temperature to be set for the user at the user-departure time based on a second machine learning prediction model;
determining a battery-temperature of a battery of the electric vehicle to be set at the user-departure time based on a third machine learning prediction model;
determining a present charge level of a battery of the electric vehicle;
computing a charging start-time to start charging the battery based on one or more attributes of a charging station to which the electric vehicle is coupled, and based on the user-departure time, the cabin temperature, and the battery-temperature; and
initiating charging the battery at the charging start-time.

16. The computer-implemented method of claim 15, wherein the method further comprises starting the electric vehicle at a vehicle start-time, which is prior to the user-departure time.

17. The computer-implemented method of claim 16, wherein the cabin temperature is adjusted at the vehicle start-time.

18. The computer-implemented method of claim 15, wherein the one or more attributes of the charging station are determined based on a prior charging session by another electric vehicle, wherein the one or more attributes are stored in a remote location.

19. The computer-implemented method of claim 15, wherein the method further comprises displaying, to the user, a confirmation message comprising one or more predicted values comprising the user-departure time, and the cabin temperature.

20. The computer-implemented method of claim 19, wherein the method further comprises receiving, from the user, adjustments to at least one of the user-departure time, and the cabin temperature.

\* \* \* \* \*